United States Patent [19]

Anderson et al.

[11] Patent Number: 4,651,587
[45] Date of Patent: Mar. 24, 1987

[54] RING GEAR/PINION GEAR DESIGN

[75] Inventors: Craig B. Anderson; George W. Vollmer, both of Glasgow, Ky.

[73] Assignee: Eaton Corporation, Cleveland, Ohio

[21] Appl. No.: 761,262

[22] Filed: Aug. 1, 1985

[51] Int. Cl.⁴ .............................................. F16H 55/20
[52] U.S. Cl. ..................................... 74/459.5; 74/424; 74/7 B; 29/159.2
[58] Field of Search ...................... 74/713, 459.5, 417, 74/423, 424, 710, 325; 29/159.2

[56] References Cited

U.S. PATENT DOCUMENTS 3,213,700 10/1965 Braunyer .............................. 74/459.5
3,805,353 4/1974 Fountain et al. ................... 29/159.2

Primary Examiner—Richard J. Scanlan, Jr.
Assistant Examiner—Joseph A. Fischetti
Attorney, Agent, or Firm—D. A. Rowe; H. D. Gordon

[57] ABSTRACT

A design for a series of ring gear and pinion gear right angle gear-sets (100) utilizing a single common ring gear (114) and a plurality of pinion gears (112A–D), each having different numbers of teeth, is provided.

12 Claims, 6 Drawing Figures

RING GEAR/PINION GEAR DESIGN

BACKGROUND OF THE INVENTION

1. Field of the Invention

The present invention relates to the design of ring gear/pinion gear drive gear-sets for heavy-duty drive axles and more particularly, to the design of a family or series of such gear-sets comprising a single ring gear design utilizable with any one of a series of specially designed pinion gears, each member of the series utilizing a pinion gear having a different number of teeth.

2. Description of the Prior Art

Right angle drive trains for heavy duty drive axles utilizing pinion gear/ring gear gear-sets are well known in the prior art, as may be seen by reference to U.S. Pat. Nos. 3,265,173; 4,018,097; 4,046,210; 4,050,534 and 4,263,834, the disclosures of which are hereby incorporated by reference. Such gear-sets are usually of the well known spiral bevel or hypoid gear type.

It is also well known to design a series or family of gear-sets, having a similar torque capacity, but different ratios. For example, a well know series of prior art drive axles utilizes a series of pinions each having a different number of teeth (i.e. 6, 7, 8 and 9) for meshing engagement with a series of ring gears having a given pitch diameter (i.e. 16½ inch) and number of teeth (i.e. 39) to provide a plurality of input shaft to output shaft ratios (6.50:1; 5.57:1; 4.88:1 and 4.33:1).

In designing such a series or family of gear-sets, each individual ratio utilized a unique ring gear specially designed to properly mesh with a particular specially designed pinion. Properly meshing involves running with a minimum of noise, for an acceptable period of time under a rated load in both the driving and driven (i.e. drive and coast) modes of operation. For example, the 39 tooth ring gear designed to properly mesh with the 7 tooth pinion (i.e. the "7/39" ring gear) was different from the 39 tooth ring gear designed to properly mesh with the 8 tooth pinion (i.e. the "8/39" ring gear) and would not properly mesh with the 6, 8 or 9 tooth pinions.

While the individual gear-sets of the family or series of ring gear/pinion gear gear-sets of the prior art operated in a very acceptable manner, such a method of designing and manufacturing gear-sets was not economically desirable, especially as to the relatively larger more costly ring gears, in the volumes and variety of sizes and ratios associated with heavy-duty drive axles (i.e. drive axles utilized with heavy-duty trucks, off-the-road construction vehicles and the like.)

SUMMARY OF THE INVENTION

In accordance with the present invention, the drawbacks of the prior art are overcome, or minimized, by the provision of a family or series of ring gear/pinion gear gear-set gear tooth design allowing a common ring gear, such as a 16½ inch 39 tooth ring gear, to properly mesh with any selected one of a series of pinions, such as 6 tooth, 7 tooth, 8 tooth and 9 tooth pinions, to provide a family or series of gear-sets (i.e. 6/39, 7/39, 8/39 and 9/39) requiring only a single ring gear and a multiplicity of pinion gears.

The above is accomplished by selecting a family of ring gear/pinion gear gear-sets comprising a selected size (such as 16½ inch pitch diameter) and number of teeth (such as 39) ring gear and a plurality (usually three or four) of different number of teeth pinion gears (such as 6, 7, 8 and 9 tooth pinion gears) to mesh therewith and define a selectable series of ratios (6/39, 7/39, 8/39 and 9/39 or 6.50:1, 5.57:1, 4.88:1 and 4.33:1, respectively). A base ratio gear-set, such as preferably the 7/39 or 6/39 gear-set, is then selected. As will be discussed below, in the preferred embodiment the gear-set having the least, or the next to least, number of teeth pinion gear is utilized. The conventionally designed, or substantially conventionally designed, base ratio ring gear will then be utilized as the common ring gear for the family. The conventionally designed base ratio pinion will also be utilized. The remaining pinions of the family will then be modified from conventional design by modifying the base cone diameters (to achieve a constant series pressure angles, both drive and coast), root angles and/or face angles in a specific manner. As is well known, base cone diameter equals pitch diameter multiplied by the cosine of the pressure angle.

In nontrue involute type gearing, such as Formate type gearing, the cutter blade geometry and/or cutting machine settings are modified to obtain the desired pressure angles.

Accordingly, it is an object of the present invention to provide a heavy-duty drive axle ring gear/pinion gear gear-set tooth design criteria allowing a single common ring gear to be utilized with a series of different number of gear tooth pinions to provide a more economically produced family of gear-sets.

This and other objects and advantages of the present invention will become apparent for a reading of the detailed description of the preferred embodiment taken in view of the drawings.

DESCRIPTION OF THE PREFERRED EMBODIMENT

Figure 1:
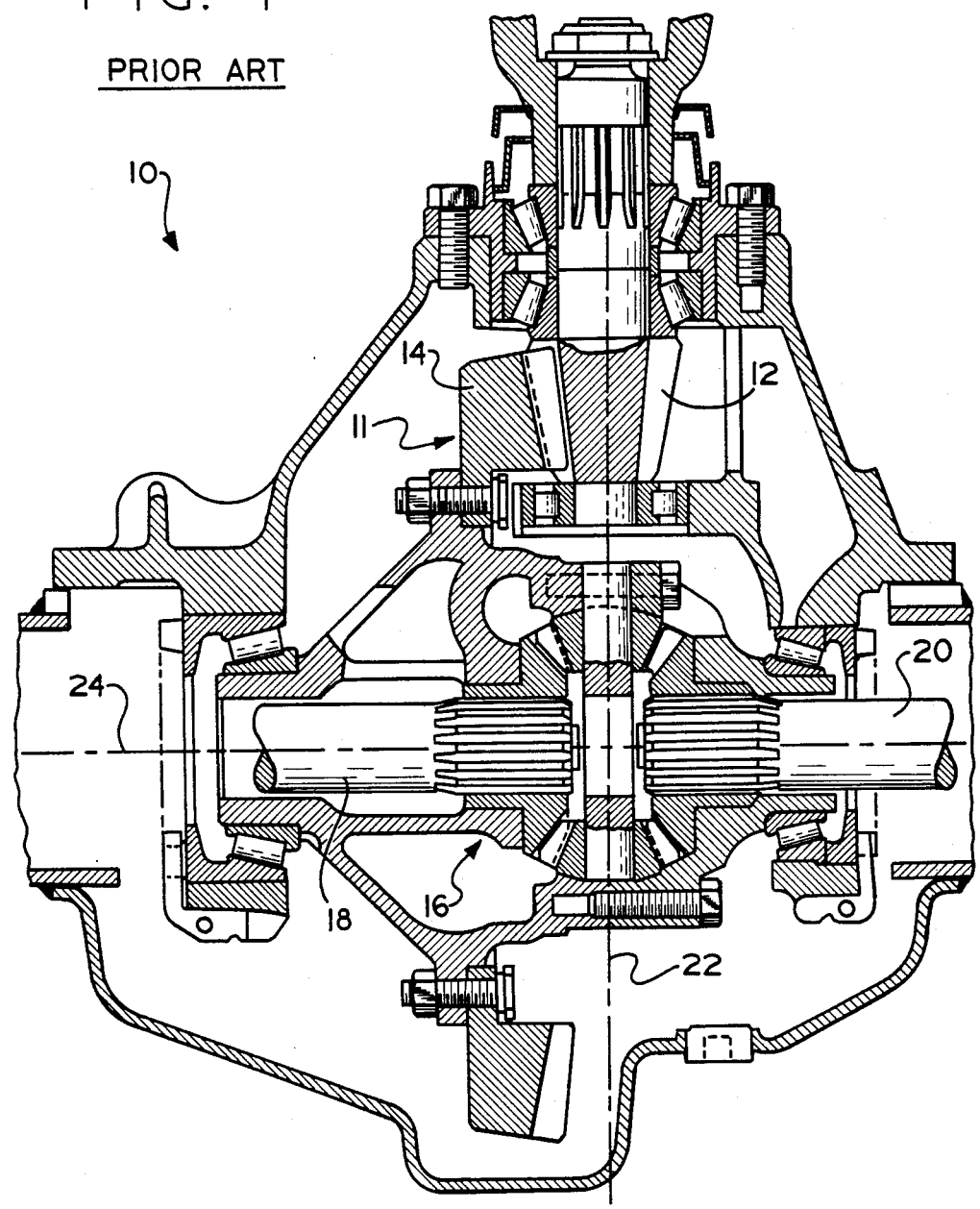
FIG. 1 is a partial sectional view of a typical prior art heavy-duty drive axle of the type utilizing ring gear/pinion gear drive gears.

In the following description of the present invention, certain terms will be utilized for purposes of reference only and are not intended to be limiting. The terms "upward", "downward", "rightward" and "leftward" refer to directions in the drawings to which reference is made. The terms "inward" and "outward", respectively, refer to directions towards and away from, respectively, the geometric center of the device described. Said terminology will include the words above specifically mentioned, derivatives thereof and words of similar import.

The use of ring gear/pinion gear right angle gear-sets in the drive train of heavy-duty drive axles is well known in the prior art. Referring to FIG. 1, a single reduction drive axle 10 utilizing such a gear-set 11 comprising a pinion gear 12 meshingly engaged with a ring gear 14 is illustrated. A differential assembly 16 is fixed to the ring gear for driving the two axle shafts 18 and 20. The axis of rotation 22 of the pinion gear 14 is substantially perpendicular to the axis of rotation 24 of ring gear 14 (and of differential 16 and axle shafts 18 and 20. Heavy-duty drive axles of this, and of the two-speed planetary double reduction type, are well known in the prior art.

Figure 2A:
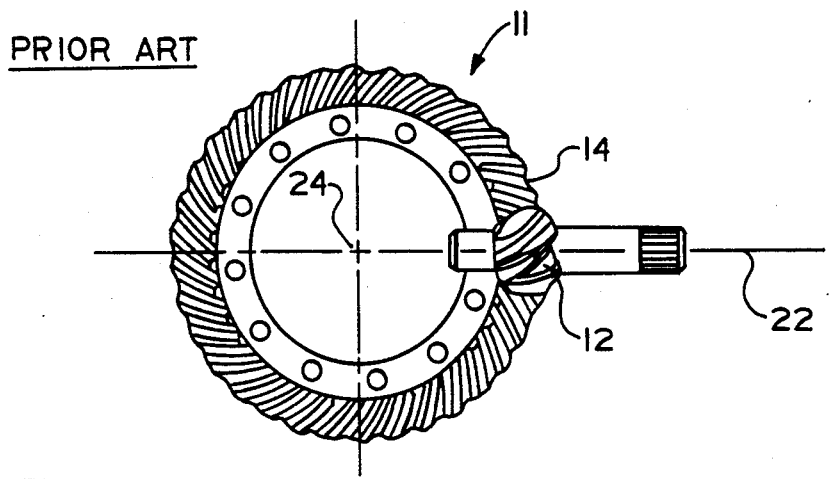
FIGS. 2A and 2B illustrate prior art spiral bevel and hypoid ring gear/pinion gear drive gears, respectively.
Figure 2B:
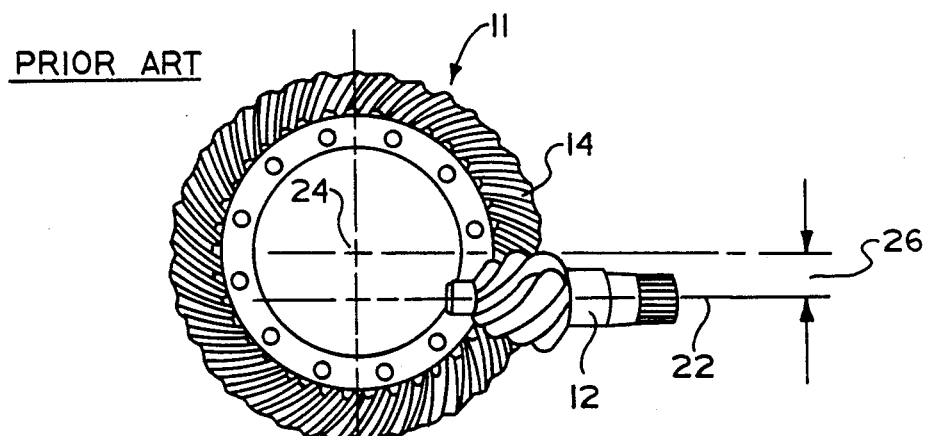

Most heavy-duty drive axles utililze right angle ring gear/pinion gear gear-sets of either the spiral bevel or hypoid type as illustrated in FIGS. 2A and 2B, respectively. As may be seen, in a spiral bevel gear-set, FIG. 2A, the axes of rotation 22 and 24 are perpendicular and intersect while in a hypoid gear-set, FIG. 2B, the axes 22 and 24 are offset by a distance 26, the hypoid offset, usually about 1.00 to 2.00 inches, in a gear-set having a 16½ inch pitch diameter ring gear.

As is known, spiral bevel gears provide, in theory, a totally rolling, not sliding, gear contact at the pitch line whereas hypoid gear-sets can be smaller, but do have a degree of sliding gear contact at the pitch line. In recent years, with improvements in gear design and lubrication, sliding contact is not the major problem it once was and hypoid gear-sets for heavy-duty drive axles are becoming more accepted. The present invention will, for ease of explanation, be illustrated in connection with a spiral bevel gear-set, it being understood that the present invention is equally well suited for both spiral bevel and hypoid gear-sets as well as modifications thereof. The features and advantages of spiral bevel and hypoid ring gear/pinion gear gear-sets are well known in the prior art as may be seen by reference to SAE Paper No. 841085, the disclosure of which is hereby incorporated by reference.

In the past, a family of ring gear/pinion gear gear-sets 11, such as a series comprising the sets of a 16½ inch pitch diameter 39 tooth ring gear and a 6 tooth pinion gear, a 16½ inch pitch diameter 39 tooth ring gear and a 7 tooth pinion, a 16½ inch pitch diameter ring gear and an 8 tooth pinion and a 16½ inch pitch diameter ring gear and a 9 tooth pinion involved four different 16½ inch pitch diameter 39 tooth ring gears as well as four different pinion gears. The various 16½ inch pitch diameter 39 tooth ring gears differed as to tooth addendum and dedendum, pitch apex (hypoid only), face apex, root apex, pitch angle, face angle, root angle, etc. The pressure angles of the gear-sets also usually differed.

Figure 3:
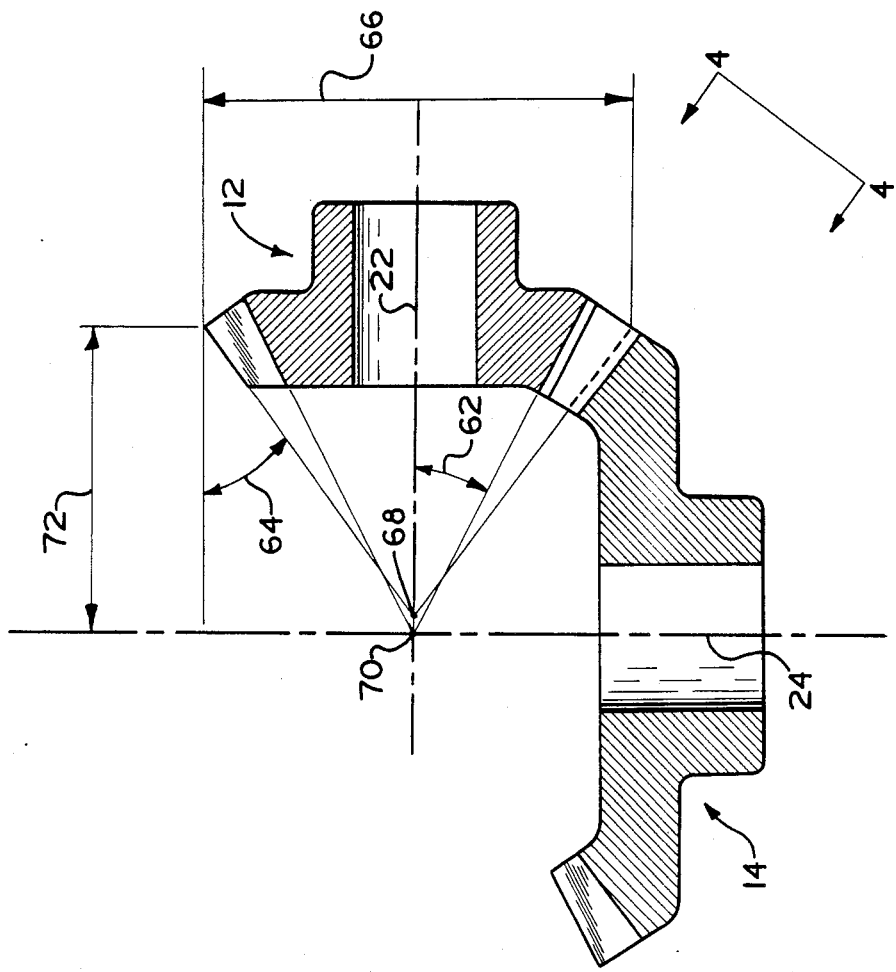
FIG. 3 illustrates a typical bevel gear-set with the parameter nomenclature indicated.
Figure 4:
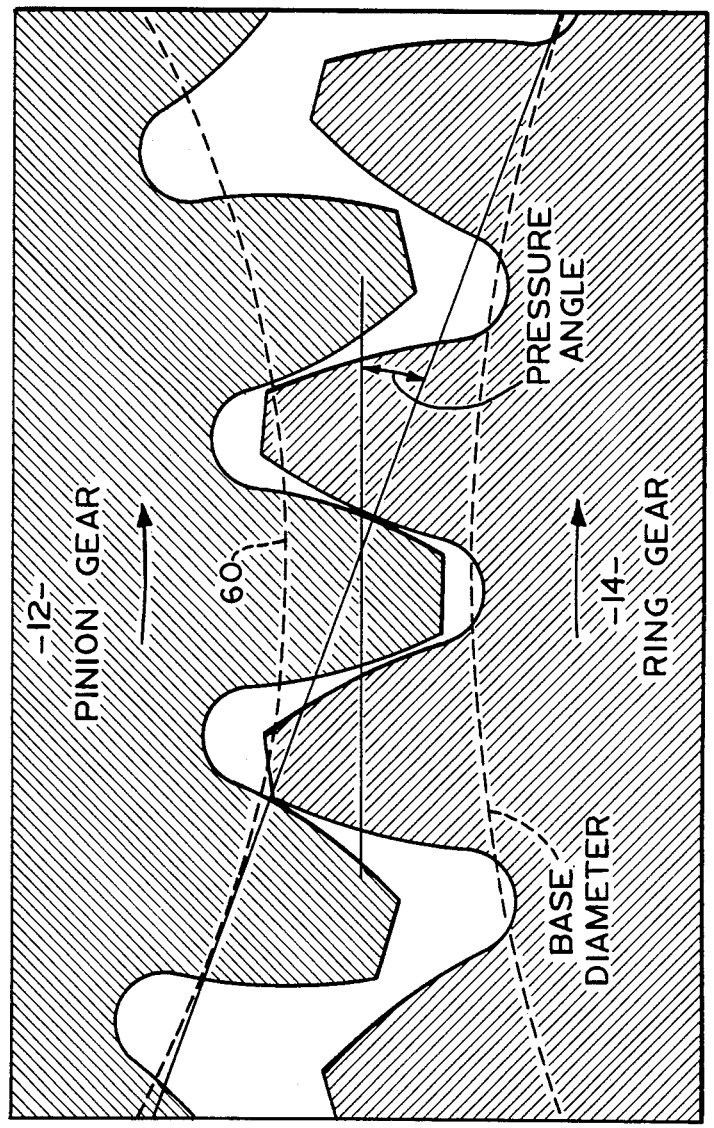
FIG. 4 illustrates a typical set of engaged teeth illustrating additional parameter nomenclatures.

The nomenclature and geometry of ring gear/pinion gear gear-sets is well known and various of the above-mention parameters are illustrated in FIGS. 3 and 4.

The conventionally designed 39 tooth ring gear designed to properly mesh with the conventionally designed 7 tooth pinion (usually called the "7/39" ring gear) was different from the conventionally designed "6/39", the "8/39" and the "9/39" ring gears of same pitch diameter and would not properly mesh with the conventionally designed 6, 8 or 9 tooth pinions.

It has been recognized that providing a common or universal ring gear 14 of given pitch diameter and number of teeth which would mesh with pinions of various members of teeth, i.e. a "(6, 7, 8 and 9)/39" ring gear, would be economically advantageous for manufacturing, tooling and inventorying reasons. This is especially true for heavy-duty drive axles where the volumes are relatively small and the ring gears are of a relatively massive physical size.

It is believed that such a common or universal ring gear, and/or pinion gears modified to mesh with such a universal ring gear, were not designed heretofore for at least three reasons; namely, it was not believed possible to design a series utilizing a common ring gear and a plurality of different numbers of teeth pinion gears having acceptable life and performance, prior to the availability of modern computing equipment the calculations to design a single set of gears with substantially optimized performance was very difficult and time consuming and discouraged the additional complication of attempting to design a substantially optimized series of gear-sets and the trade-offs or compromises necessary to provide a series of gear-sets 11 utilizing a common ring 14 were not believed acceptable. Design of conventional gear-sets involved known imperical methods, usually involving computer programs, as is discussed in above-mentioned S.A.E. Paper No. 841085 and S.A.E. Paper No. 841091, the disclosures of both hereby incorporated by reference.

According to the present invention, the conventional designs of certain members of a selected series of ring gear/pinion gear gear/sets 11 are modified to provide a series 100 of gear-sets comprising a universal ring gear 114 of given pitch diameter and number of teeth and a plurality of pinion gears 112A, 112B, 112C and 112D, of different numbers of teeth, each of which pinion gears will properly mesh with the common ring gear to define a gear-set 11 of the gear-set series (100).

Figure 5:
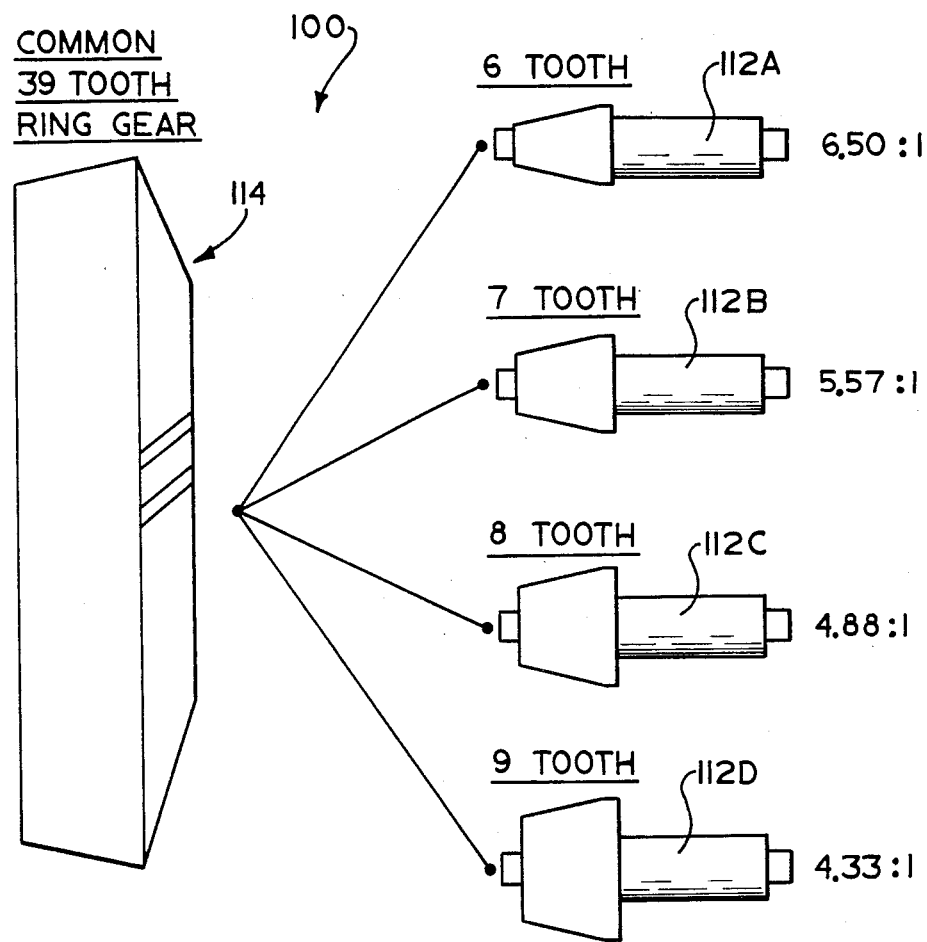
FIG. 5 is a schematic illustration of a ring gear/pinon gear gear-set series according to the present invention.

The first step is to select a series of ring gear 14/pinion gear 12 gear-sets 11 to be designed according to the present invention. The series is based upon a given pitch diameter (such as 16½ inch) and number of teeth (such as 39) for ring gears to mesh with a plurality of pinion gears of differing numbers of teeth. The particular series for the example is schematically illustrated in FIG. 5. While not so limited, at present only series limited to four (4) pinion gears having a consecutive number of teeth have been designed and manufactured according to the present invention.

Having selected a series, a base gear-set 11 of conventional gear design is selected. Conventional gear design of a heavy-duty drive axle gear-set, as is well known, involves designing the gear teeth of the ring gear and pinion gear for near optimal performance of that set without any consideration of designing the pinion for meshing with common ring gears matable with pinions of differing teeth. Usually, conventional design involves selecting gear tooth parameters to provide an optimized combination for minimizing undercutting, equalized and maximizing load sharing, both top to root and heal to toe, equalizing contact ratio, drive and coast, etc., in view of such factors as type of vehicle, type of prime mover, service conditions, other drive line variables (such as type of transmission) and the like. These and other design rules and factors have been developed over years of experience.

Assuming a series of gear-sets comprising pinions of consecutive number of teeth, i.e. A, A+1, A+2 . . . teeth), the conventionally designed gear-set comprising the conventionally designed A or A+1 number of teeth pinion and selected ring gear of X teeth conventionally designed to mesh with that conventionally designed pinion is selected as the base ratio gear-set (i.e. the "A/X" or "A+1/X" ring gear and A or A+1, respectively, number of teeth pinion gear). The lowest or next to lowest number of teeth pinion gear gear-set is selected as the base series. In the example, the 6 or 7 tooth pinion gear and "6/39" or "7/39" ring gear, respectively, conventionally or substantially conventionally designed gear-set will be selected as the base ratio gear-set of the series. For purposes of this example, the conventionally designed 7 tooth pinion and 7/39 ring gear will be assumed to be the base ratio gear-set.

It has been discovered that the modifications to the non-base ratio gear-set pinion gears (i.e. the 6, 8 and 9 tooth pinion gears) necessary to modify same for proper meshing contact with (maximized rolling and minimized sliding contact, maximized contact ratio, well distributed contact pattern under load, etc.) the common (i.e. the 7/39) ring gear involves more undesirable compromises for those pinion gears having a lesser number of teeth than the base ratio pinion gears. The teeth of such pinion gears, when modified as required, tend to become weaker and have greater undercutting when manufactured by conventional methods.

The above is especially true as most heavy-duty drive axle gear-sets are produced by manufacturing techniques wherein true involute gear teeth profiles are not generated but, for ease and economy of manufacture, relatively straight sided ring gear teeth profiles and more convex than involute pinion gear teeth profiles are produced. This type of "modified involute" gearing is well known and one well known in the prior art example thereof is the Formate gearing system of the Gleason Works.

Once the base ratio gear-set is selected, the pinion gear 12 of that ratio and the ring gear 14 of that ratio, as substantially conventionally designed, will be utilized in the series. For spiral bevel gearing, the base ratio ring gear design of conventional design is utilized, while for hypoid gearing a slightly lower mean spiral angle ring gear may be required.

The pinion gears 12 for the non-base ratio gear-sets of the series must then be modified to properly mesh, with as little compromise as possible from optimal design, with the common or base ratio ring gear. The major modifications to the non-base ratio pinion gears are as indicated below. The most critical modifications (as compared to conventional design equal drive and coast contact ratio) are to the pressure angles to maintain constant pressure angles throughout the series equal to the base ratio pressure angles, the root angle and the face angle.

The below tables sets forth various pinion gear parameters, one or more of which are usually modified from conventional gear design as indicated to provide pinion gears properly meshing with the common ring 114.

| Pinion Gear Parameter | No. of Pinion Gear Teeth (Base Ratio Having A Teeth) | | |
|---|---|---|---|
| | A − 1 | A + 1 | A + 2 |
| Drive Base Cone Diameter (60) | + | − | − − |
| Coast Base Cone Diameter | − | + | + + |
| Drive Pressure Angle (of gear set) | − | + | + + |
| Coast Pressure Angle (of gear set) | + | − | − − |
| Root Angle (62) | + | − | − − |
| Face Angle (64) | + | − | − − |
| Outside Diameter (66) | + | − | − − |
| Face Apex (68) | − | + | + + |
| Root Apex (70) | − | + | + + |
| Crown to Crossing Point (72) | − | + | + + |

In the above chart, a plus ("+") indicates an increase, and a double plus ("++") a greater increase, from conventional design while a minus ("−") indicates a decrease, and a double minus ("− −") a greater decrease, from standard or conventional design.

It is recognized that many commercially utilized spiral bevel and/or hypoid type gear-sets, such as Formate gearing for example, do not utilize true involute type gears, and thus the pinion gears do not have a true base cone or base cone diameter. However, for purposes of defining the present invention, the product of the pinion gear's pitch diameter times the gear-set (or series of gear-sets) pressure angle (which is to be maintained constant for the series of gear-sets) shall be considered the base cone diameter.

We claim:

1. A series of substantially right angle ring gear/pinion gear gear-sets of one of substantially spiral bevel type and substantially hypoid type gearing for heavy-duty drive axles comprising a common ring gear having X number of teeth and a given pitch diameter and a first, second and third pinion gear having A, B, and C, respectively, number of teeth each interchangeably engagable with said ring gear to define X/A, X/B and X/C ratio, respectively, gear-sets, the gear tooth geometry of each of said pinion gears selected to provide substantially equal drive pressure angles for each of said gear-sets and substantially equal coast pressure angles for each of said gear sets wherein:

A, B, C and X are positive integers;
A<B<C<X;
said pinion gear having B number of teeth and said ring gear are of substantially conventional design for an X/B ring gear/B tooth pinion gear gear-set; and said A number of teeth pinion gear has a greater root angle and a greater face angle than a conventionally designed A number of teeth pinion gear designed for an X/A ring gear/A tooth pinion gear gear-set, said C number of tooth pinion gear has a smaller root angle and a smaller face angle than a conventionally designed C number of tooth pinion gear designed for an X/C ring gear/C tooth pinion gear gear-set.

2. The series of claim 1, additionally comprising a fourth D number of teeth pinion gear interchangeably meshingly engageable with said common ring gear, said D number of tooth pinion gear having a gear tooth geometry selected to provide a pressure angle of the ring gear/fourth pinion gear gear-set substantially equal to the pressure angle of said ring gear/third pinion gear gear-set wherein D is a positive integer, and
C<D.

3. The series of claim 1 wherein:
$B = A+1$, and
$C = A+2$.

4. The series of claim 2 wherein:
$B = A+1$;
$C = A+2$; and
$D = A+3$.

5. The series of claim 1, wherein the drive base cone diameter of said A number of teeth pinion gear is less, and the coast base cone diameter of said A number of teeth pinion gear is greater, respectively, than the drive and coast base cone diameters, respectively, of a conventionally designed A number of teeth pinion gear designed for an X/A ring gear/A tooth pinion gear gear-set, and wherein the drive base cone diameter of said C number of teeth pinion gear is greater, and the coast base cone diameter is less, respectively, than the drive and coast base cone diameters, respectively, of a conventionally designed C number of tooth pinion gear designed for a X/C ring gear/C tooth pinion gear gear-set.

6. The series of claim 5, wherein the drive base cone diameter of said first pinion gear less than the drive base cone diameter of said second pinion gear and the drive base cone diameter of said second pinion gear less than the drive base cone diameter of said third pinion gear drive and the coast base cone diameter of said first pinion gear greater than the coast base cone diameter of said second pinion gear and the coast base cone diameter of said second pinion gear greater than the coast base cone diameter of said third pinion gear.

7. The series of claim 3, wherein the drive base cone diameter of said A number of teeth pinion gear is less, and the coast base cone diameter of said A number of teeth pinion gear is greater, respectively, than the drive and coast base cone diameters, respectively, of a conventionally designed A number of teeth pinion gear designed for an X/A ring gear/A tooth pinion gear gear-set, and wherein the drive base cone diameter of said C number of teeth pinion gear is greater, and the coast base cone diameter is less, respectively, than the drive and coast base cone diameters, respectively, of a conventionally designed C number of tooth pinion gear designed for a X/C ring gear/C tooth pinion gear gear-set.

8. The series of claim 1, wherein the drive base cone diameter of said first pinion gear is less than the drive base cone diameter of said second pinion gear and the drive base cone diameter of said second pinion gear is less than the drive base cone diameter of said third pinion gear drive and the coast base cone diameter of said first pinion gear is greater than the coast base cone diameter of said second pinion gear and the coast base cone diameter of said second pinion gear is greater than the coast base cone diameter of said third pinion gear.

9. A series of substantially right angle ring gear/pinion gear gear-sets of one of substantially spiral bevel type and substantially hypoid type gearing for heavy-duty drive axles comprising a common ring gear having X number of teeth and a given pitch diameter and a first, second and third pinion gear having A, B, and C, respectively, number of teeth each interchangeably engagable with said ring gear to define X/A, X/B and X/C ratio, respectively, gear-sets, the gear tooth geometry of each of said pinion gears selected to provide substantially equal drive pressure angles for each of said gear-sets and substantially equal coast pressure angles for each of said gear sets wherein:

A, B, C and X are positive integers;

$A < B < C < X$;

said pinion gear having A number of teeth and said ring gear are of substantially conventional design for an X/A ring gear/A tooth pinion gear gear-set; and said B number of teeth pinion gear has a smaller root angle and a smaller face angle than a conventionally designed B number of teeth pinion gear designed for an X/B ring gear/B tooth pinion gear gear-set, said C number of tooth pinion gear has a smaller root angle and a smaller face angle than a conventionally designed C number of tooth pinion gear designed for an X/C ring gear/C tooth pinion gear gear-set.

10. The series of claim 9, wherein the drive base cone diameter of said first pinion gear is less than the drive base cone diameter of said second pinion gear and the drive base cone diameter of said second pinion gear is less than the drive base cone diameter of said third pinion gear drive and the coast base cone diameter of said first pinion gear is greater than the coast base cone diameter of said second pinion gear and the coast base cone diameter of said second pinion gear is greater than the coast base cone diameter of said third pinion gear.

11. The series of claim 9, wherein the drive base cone diameter of said B number of teeth pinion gear is greater, and the coast base cone diameter of said B number of teeth pinion gear is less, respectively, than the drive and coast base cone diameters, respectively, of a conventionally designed B number of teeth pinion gear designed for a X/B ring gear/B tooth pinion gear gear-set, and the drive base cone diameter of said C number of teeth pinion gear is greater, and the coast base cone diameter of said C number of teeth pinion gear is less, respectively, than the drive and coast base cone diameters, respectively, of conventionally designed C number of tooth pinion gear designed for a X/C ring gear/C tooth pinion gear gear-set.

12. The series of claim 11 wherein:

$B = A + 1$, and $C = A + 2$.

* * * * *